US012103299B2

(12) United States Patent
Yoshikawa

(10) Patent No.: US 12,103,299 B2
(45) Date of Patent: Oct. 1, 2024

(54) PRINTING APPARATUS AND PRINTING METHOD

(71) Applicant: SEIKO EPSON CORPORATION, Tokyo (JP)

(72) Inventor: Eishin Yoshikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 212 days.

(21) Appl. No.: 17/807,870

(22) Filed: Jun. 21, 2022

(65) Prior Publication Data
US 2022/0410597 A1 Dec. 29, 2022

(30) Foreign Application Priority Data

Jun. 23, 2021 (JP) ................................ 2021-103913

(51) Int. Cl.
| | |
|---|---|
| *B41J 11/00* | (2006.01) |
| *B41J 2/21* | (2006.01) |
| *C09D 4/06* | (2006.01) |
| *C09D 11/322* | (2014.01) |
| *C09D 11/54* | (2014.01) |

(52) U.S. Cl.
CPC ....... *B41J 11/00212* (2021.01); *B41J 2/2107* (2013.01); *B41J 11/00214* (2021.01); *C09D 4/06* (2013.01); *C09D 11/322* (2013.01); *C09D 11/54* (2013.01)

(58) Field of Classification Search
CPC ......... B41J 2/21; B41J 2/01; B41J 2/15; B41J 11/00; C09D 11/322; C09D 11/101; C09D 11/40; C09D 11/54; B41M 7/00
See application file for complete search history.

(56) References Cited

U.S. PATENT DOCUMENTS

| | | | |
|---|---|---|---|
| 7,794,077 B2* | 9/2010 | Falser | B41J 2/1433 347/37 |
| 10,059,115 B2* | 8/2018 | Kuribayashi | B41J 2/17509 |
| 2004/0099170 A1* | 5/2004 | Takabayashi | C09D 11/101 101/491 |
| 2012/0127249 A1* | 5/2012 | Mizutaki | C09D 11/40 522/18 |
| 2014/0292968 A1 | 10/2014 | Hayashi et al. | |

(Continued)

FOREIGN PATENT DOCUMENTS

JP 2014-195889 A 10/2014

*Primary Examiner* — John Zimmermann
(74) *Attorney, Agent, or Firm* — Global IP Counselors, LLP

(57) ABSTRACT

A printing apparatus includes an ejection head including a first nozzle row configured to eject, toward a recording medium, a first liquid containing a photopolymerization initiator and a second nozzle row configured to eject, toward the recording medium, a second liquid containing the polymerizable compound and a color material and not containing the photopolymerization initiator, a driving unit configured to change relative positions of the ejection head and the recording medium, and an irradiation unit configured to irradiate, with the light, the recording medium onto which the first liquid and the second liquid are deposited. The first liquid and the second liquid are ejected from the ejection head so that the second liquid overlaps the first liquid on a surface of the recording medium. A distance between the irradiation unit and the first nozzle row is longer than a distance between the irradiation unit and the second nozzle row.

7 Claims, 9 Drawing Sheets

(56) References Cited

U.S. PATENT DOCUMENTS

| | | | | |
|---|---|---|---|---|
| 2014/0370214 A1* | 12/2014 | Araki | .................. | C09D 11/101 |
| | | | | 428/137 |
| 2017/0015097 A1* | 1/2017 | Ohara | ................. | G06K 15/102 |
| 2017/0021641 A1* | 1/2017 | Goi | ...................... | C09D 11/107 |
| 2017/0028753 A1* | 2/2017 | Ogawa | ............... | B41J 11/00212 |
| 2020/0086643 A1* | 3/2020 | Imoto | ................. | B41J 2/14088 |
| 2020/0238730 A1* | 7/2020 | Kawakami | ........... | B41J 11/0015 |
| 2020/0385589 A1* | 12/2020 | Yamaguchi | .......... | C09D 11/322 |
| 2021/0387463 A1* | 12/2021 | Ohnishi | ............... | B41M 7/0045 |

\* cited by examiner

PRINTING APPARATUS AND PRINTING METHOD

The present application is based on, and claims priority from JP Application Serial Number 2021-103913, filed Jun. 23, 2021, the disclosure of which is hereby incorporated by reference herein in its entirety.

BACKGROUND

1. Technical Field

The present disclosure relates to a technique for performing printing on a recording medium using a photocurable liquid containing a color material.

2. Related Art

Inkjet printers that eject ultraviolet light-curable ink, referred to as UV ink, from nozzles of an ejection head toward a recording medium are known. This type of inkjet printer is equipped with an irradiator beside the ejection head that irradiates ultraviolet light toward the recording medium onto which UV ink is deposited. However, when ultraviolet light leaking from the irradiator enters an ejection surface of the ejection head that includes many nozzles, an ejection defect in which the UV ink deposited onto the ejection surface cures, clogging the nozzles, may occur. Maintenance in which the cured UV ink is wiped off the ejection surface is therefore performed. However, when the UV ink deposited onto the ejection surface cures excessively, a situation arises in which the cured UV ink cannot be easily removed from the ejection surface. The technique disclosed in JP-A-2014-195889 simplifies maintenance by tilting the irradiator positioned between printing heads in a transport direction of the recording medium toward the printing head that ejects ink relatively hard to cure.

When the curing of the UV ink on the ejection surface can be further suppressed, it is possible to reduce ejection defects such as nozzle clogging.

Note that problems such as described above also exist in printing apparatuses other than an inkjet printer that ejects UV ink, such as an inkjet printer that ejects ink cured by visible light.

SUMMARY

A printing apparatus according to the present disclosure includes an ejection head including a first nozzle row configured to eject, toward a recording medium, a first liquid containing a photopolymerization initiator that initiates a polymerization reaction of a polymerizable compound by irradiation with light and a second nozzle row configured to eject, toward the recording medium, a second liquid containing the polymerizable compound and a color material and not containing the photopolymerization initiator, a driving unit configured to change relative positions of the ejection head and the recording medium, and an irradiation unit configured to irradiate, with the light, the recording medium onto which the first liquid and the second liquid are deposited. The first liquid and the second liquid are ejected from the ejection head so that the second liquid overlaps the first liquid on a surface of the recording medium, and a distance between the irradiation unit and the first nozzle row is longer than a distance between the irradiation unit and the second nozzle row.

Further, a printing method according to the present disclosure is a printing method of a printing apparatus including an ejection head configured to eject, toward a recording medium, a liquid that is cured by irradiation with light, a driving unit configured to change relative positions of the ejection head and the recording medium, and an irradiation unit configured to irradiate, with the light, the recording medium, the printing apparatus including a first nozzle row and a second nozzle row, a distance between the irradiation unit and the first nozzle row being longer than a distance between the irradiation unit and the second nozzle row. The printing method includes an ejecting step for ejecting, from the first nozzle row toward the recording medium, a first liquid containing a photopolymerization initiator that initiates a polymerization reaction of a polymerizable compound by irradiation with the light, and ejecting, from the second nozzle row toward the recording medium, a second liquid containing the polymerizable compound and a color material and not containing the photopolymerization initiator so that the second liquid overlaps the first liquid on a surface of the recording medium, and an irradiating step for irradiating, with the light, the recording medium onto which the first liquid and the second liquid are deposited.

DESCRIPTION OF EXEMPLARY EMBODIMENTS

Figure 1:
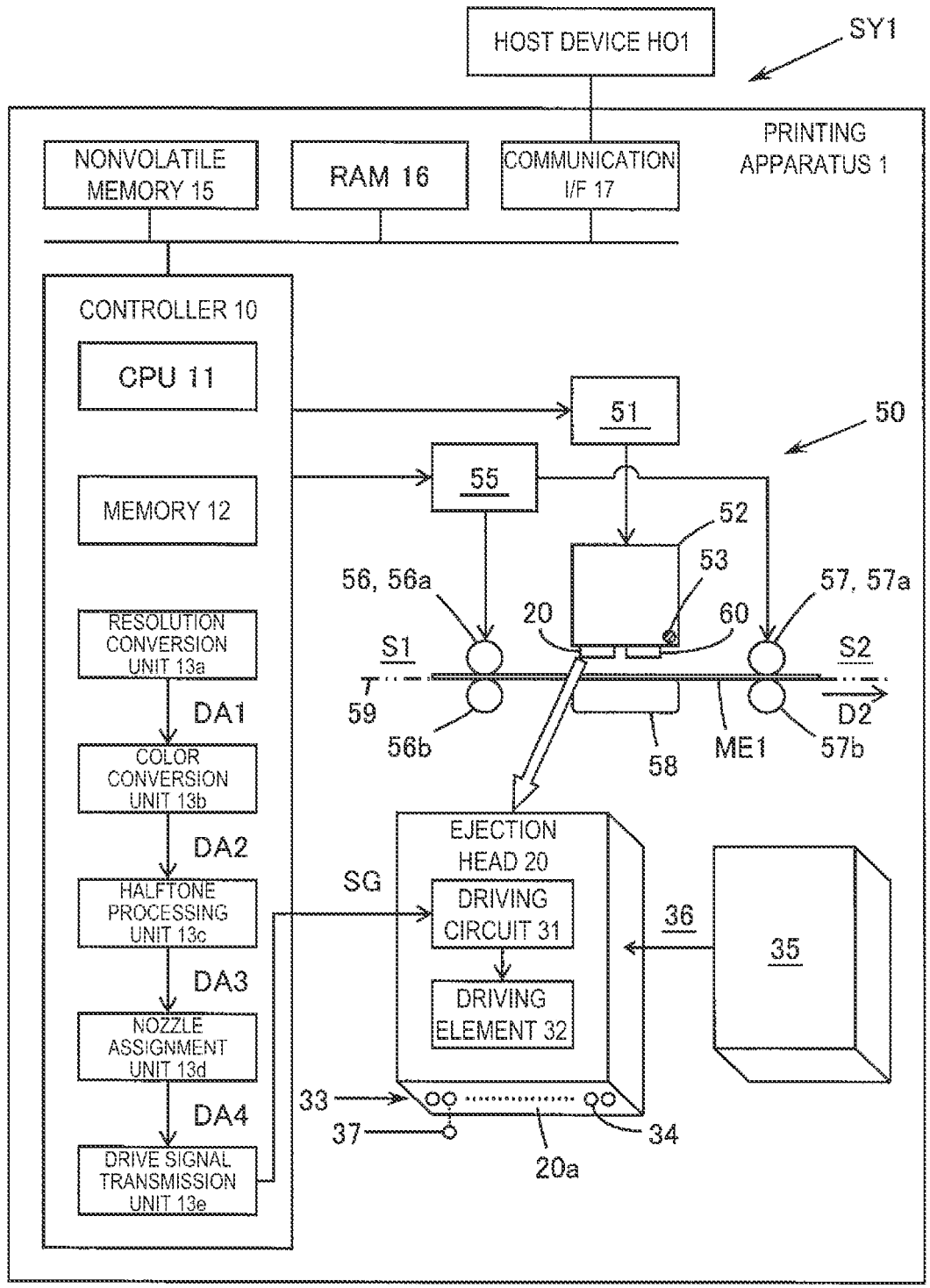
FIG. 1 is a diagram schematically illustrating an example of a printing system including a printing apparatus that uses a liquid cured by irradiation with light.

Exemplary embodiments of the present disclosure will be described. Of course, the following exemplary embodiments only illustrate the present disclosure, and not all features illustrated in the exemplary embodiments are indispensable for the solution of the disclosure.

1. Overview of Technique Included in Present Disclosure

First, an overview of the technique included in the present disclosure will be described with reference to examples illustrated in FIG. 1 to FIG. 10. Note that the drawings of the present application schematically illustrate the examples, that an enlargement factor in each direction illustrated in each drawing may vary among the drawings, and that the drawings may not be consistent with one another. Of course, the elements of the technique are not limited to specific examples illustrated with reference numerals. In the "Overview of Technique Included in Present Disclosure", information in parentheses is a supplementary description of the words immediately prior to the parentheses.

Further, in this application, a numerical range "from Min to Max" means greater than or equal to Min and less than or equal to Max. A composition ratio expressed in a chemical formula indicates a stoichiometric ratio, and substances expressed in a chemical formula include those that deviate from the stoichiometric ratio.

Aspect 1

A printing apparatus 1 according to an aspect of this technique includes an ejection head 20, a driving unit 50, and an irradiation unit 60. The ejection head 20 includes a first nozzle row 41 configured to eject, toward a recording medium ME1, a first liquid LQ1 containing a photopolymerization initiator that initiates a polymerization reaction of a polymerizable compound by irradiation with light, and a second nozzle row 42 configured to eject, toward a recording medium ME1, a second liquid LQ2 containing the polymerizable compound and a color material and not containing the photopolymerization initiator. The driving unit 50 is configured to change relative positions of the ejection head 20 and the recording medium ME1. The irradiation unit 60 is configured to irradiate, with the light, the recording medium ME1 onto which the first liquid LQ1 and the second liquid LQ2 are deposited. This printing apparatus 1 ejects the first liquid LQ1 and the second liquid LQ2 from the ejection head 20 so that the second liquid LQ2 overlaps the first liquid LQ1 on a surface ME1a of the recording medium ME1. A distance L1 between the irradiation unit 60 and the first nozzle row 41 is longer than a distance L2 between the irradiation unit 60 and the second nozzle row 42.

The second liquid LQ2 ejected from the second nozzle row 42 relatively close to the irradiation unit 60 contains the polymerizable compound and the color material, but does not contain the photopolymerization initiator. This suppresses the curing of the second liquid LQ2 in the vicinity of the second nozzle row 42 even when light leaking from the irradiation unit 60 enters the vicinity of the second nozzle row 42. The first liquid LQ1 ejected from the first nozzle row 41 relatively far from the irradiation unit 60 contains the photopolymerization initiator. When the second liquid LQ2 overlaps the first liquid LQ1 on the surface ME1a of the recording medium ME1, the photopolymerization initiator initiates a polymerization reaction of the polymerizable compound by the light irradiated from the irradiation unit 60, and the second liquid LQ2 containing the polymerizable compound and the color material is rapidly cured. The first nozzle row 41 that ejects the first liquid LQ1 containing the photopolymerization initiator is relatively far from the irradiation unit 60, and thus the light leaking from the irradiation unit 60 does not readily enter the vicinity of the first nozzle row 41. As a result, the curing of the first liquid LQ1 is suppressed in the vicinity of the first nozzle row 41. Accordingly, according to aspect 1 described above, it is possible to provide a printing apparatus that reduces ejection defects caused by the curing of a liquid containing a color material in the vicinity of a nozzle by light leaking from the irradiation unit.

Here, the ejection head may include two or more separate heads. The first nozzle row and the second nozzle row may be provided in the separate heads.

The driving unit may move the ejection head without moving the recording medium, may move the recording medium without moving the ejection head, or may move both the ejection head and the recording medium. Alternatively, the driving unit may move the ejection head in a first direction without moving the recording medium, and move the recording medium in a second direction intersecting the first direction without moving the ejection head. Each of these cases is included in the changing of the relative positions of the ejection head and the recording medium.

The light includes ultraviolet light abbreviated as UV, visible light, and the like.

The second liquid overlapping the first liquid on the surface of the recording medium includes both the second liquid overlapping the first liquid deposited onto the recording medium, and the first liquid overlapping the second liquid deposited onto the recording medium. The first liquid deposited onto the recording medium may include a portion not overlapping the second liquid.

A distance between the irradiation unit and the first nozzle row is the distance between the irradiation unit and, among a plurality of nozzles included in the first nozzle row, a nozzle having a shortest distance from the irradiation unit. A distance between the irradiation unit and the second nozzle row is the distance between the irradiation unit and, among a plurality of nozzles included in the second nozzle row, a nozzle having a shortest distance from the irradiation unit.

"First", "second", . . . in this application are terms used to identify each component included in a plurality of similar components, and do not imply order.

Note that the language described above applies to the aspects below as well.

Aspect 2

The first liquid LQ1 may contain the polymerizable compound. The first nozzle row 41 may eject the first liquid LQ1 containing the photopolymerization initiator and the polymerizable compound. In this case, when the photopolymerization initiator initiates the polymerization reaction of the polymerizable compound by the light irradiated from the irradiation unit 60, the polymerization reaction of the polymerizable compound in the first liquid LQ1 promotes a polymerization reaction of the polymerizable compound in the second liquid LQ2. Accordingly, according to this aspect, it is possible to quickly cure the liquid deposited onto the recording medium.

Note that, although not included in aspect 2, even in a case in which the first liquid does not contain a polymerizable compound, the photopolymerization initiator of the first liquid initiates the polymerization reaction of the polymerizable compound of the second liquid, thereby curing the liquid on the surface of the recording medium, and thus such a case is included in this technique.

Aspect 3

The first liquid LQ1 may contain a second color material. The first nozzle row 41 may eject the first liquid LQ1 containing the photopolymerization initiator and the second color material. For example, in a case in which the liquid contains a resin component, the cured resin may yellow due to changes over time. In this case, it is conceivable to make the yellowing not noticeable by adding a blue color material to the liquid in advance. Thus, in this aspect, a base color can be added to an image formed on the recording medium ME1, making it possible to provide a preferred printing apparatus.

Aspect 4

Figure 2:
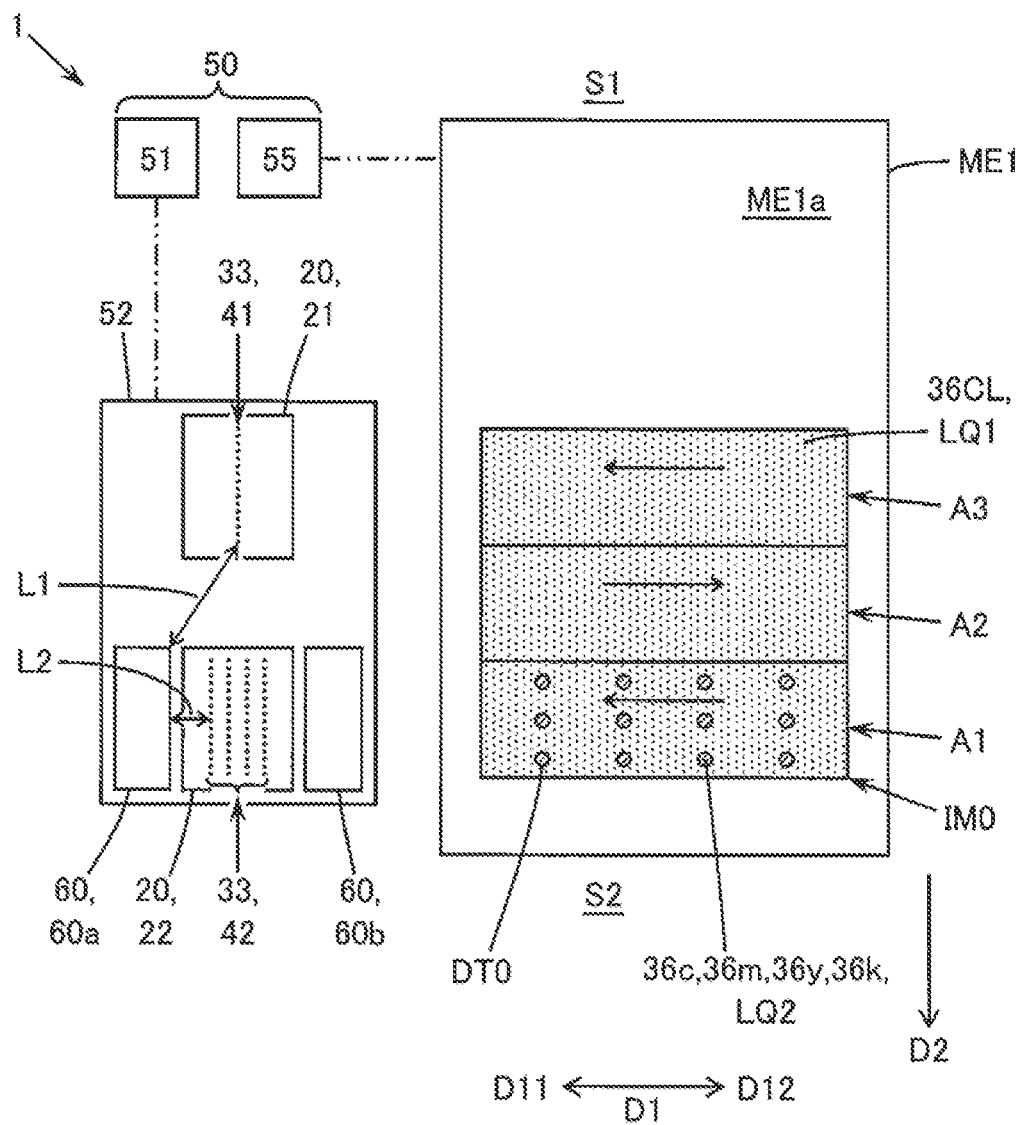
FIG. 2 is a plan view schematically describing an example of operation of the printing apparatus of a serial type.

As illustrated in FIG. 2 and the like, the driving unit 50 may change a relative position of the ejection head 20 with respect to the recording medium ME1 in a main scanning direction D1 and, when the first liquid LQ1 and the second liquid LQ2 are not ejected from the ejection head 20 toward the recording medium ME1, may change a relative position of the recording medium ME1 with respect to the ejection head 20 in a feeding direction D2 intersecting the main scanning direction D1. Here, the feeding direction D2 is a direction from an upstream side S1 toward a downstream side S2. The irradiation unit 60 may be disposed on the downstream side S2 of the first nozzle row 41, and may be in a position for irradiation toward the second liquid LQ2 deposited onto the recording medium ME1. With the irradiation unit 60 being disposed on the downstream side S2 of the first nozzle row 41 in the feeding direction D2, light can be readily irradiated onto the first liquid LQ1 deposited onto the recording medium ME1, and the distance L1 between the irradiation unit 60 and the first nozzle row 41 can be easily made longer than the distance L2 between the irradiation unit 60 and the second nozzle row 42. Accordingly, according to this aspect, it is possible to provide a preferred printing apparatus of a serial type.

Herein, "when the liquid is not ejected from the ejection head toward the recording medium" is not limited to when the liquid is not at all ejected from the ejection head, and also includes when the liquid is ejected from the ejection head but not toward the recording medium, such as in flushing. This statement applies to the aspects below as well.

Aspect 5

Figure 3:
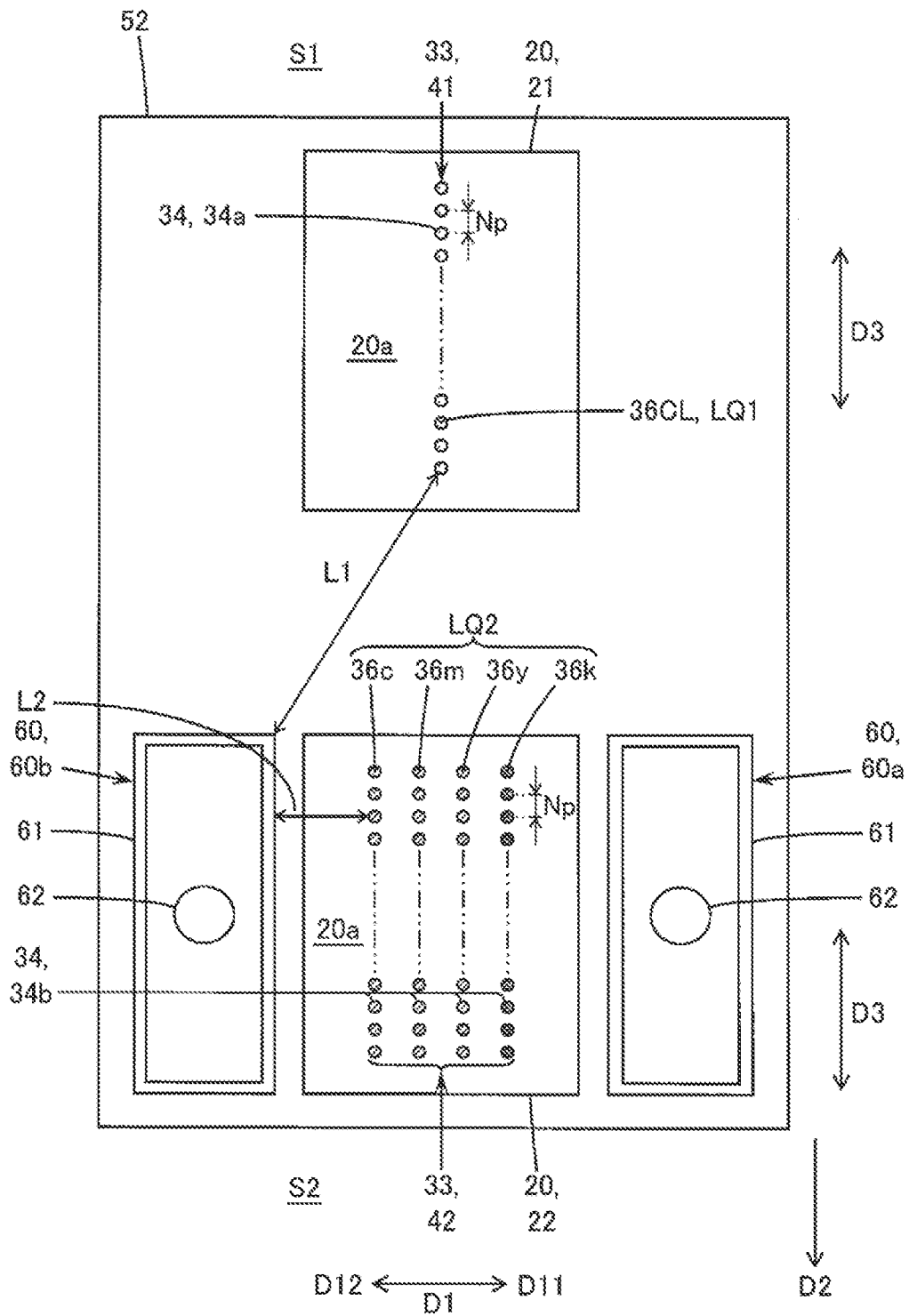
FIG. 3 is a bottom view schematically illustrating a configuration example of an ejection head and an irradiation unit.

As illustrated in FIG. 2 and FIG. 3, the second nozzle row 42 may be disposed on the downstream side S2 of the first nozzle row 41. In one main scan of the ejection head 20 relatively moving in the main scanning direction D1, an area of the recording medium ME1 configured to be irradiated by the irradiation unit 60 includes an on which the second nozzle row 42 is configured to eject the second liquid LQ2 and does not include an area on which the first nozzle row 41 is configured to eject the first liquid LQ1. In one main scan, the second liquid LQ2 is ejected to the area configured to be irradiated by the irradiation unit 60 and is irradiated with light, thereby curing the second liquid LQ2 in a state in which shapes of dots of the second liquid LQ2 containing the color material are sufficiently maintained. Accordingly, according to this aspect, it is possible to provide the printing apparatus of a serial type that improves the quality of an image formed on a recording medium.

Aspect 6

Figure 5:
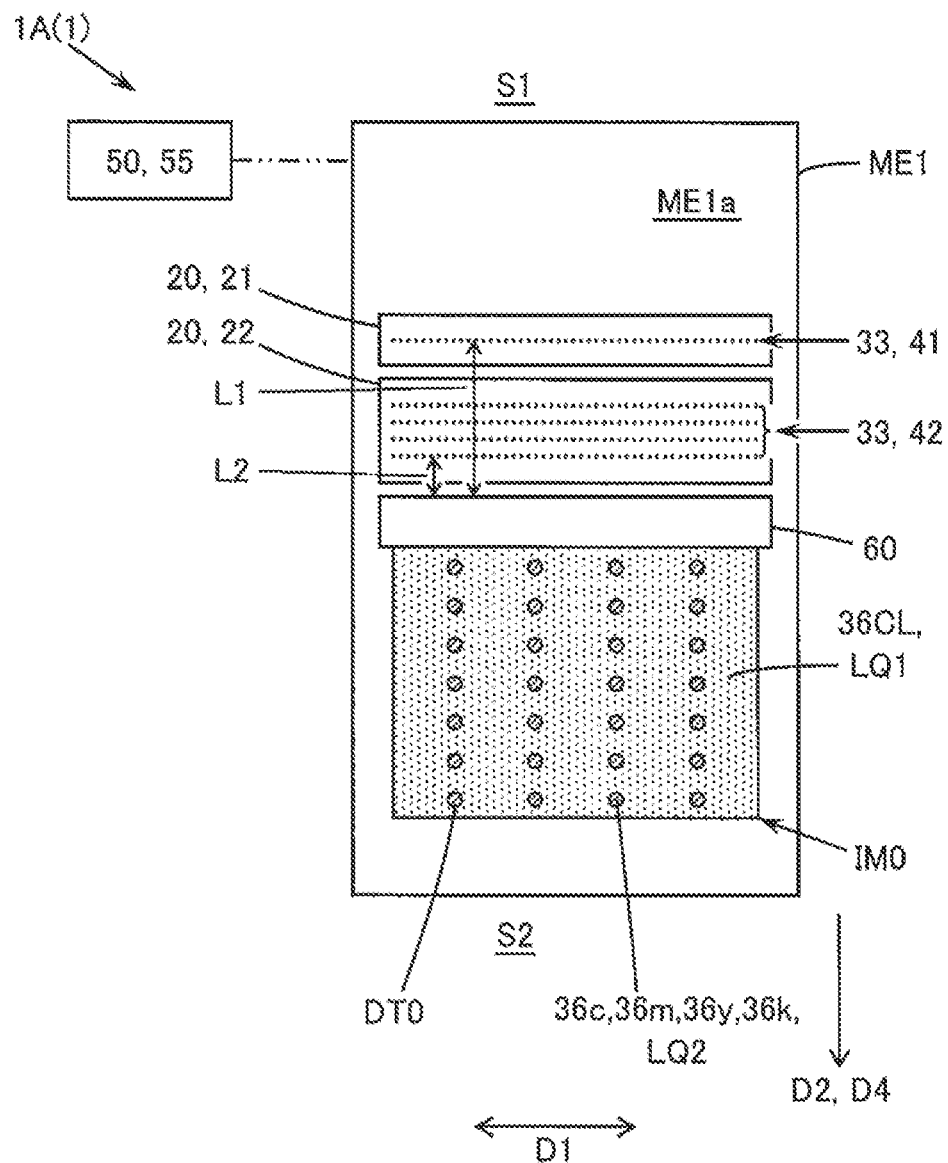
FIG. 5 is a plan view schematically describing an example of operation of a printing apparatus of a line type.
Figure 7:
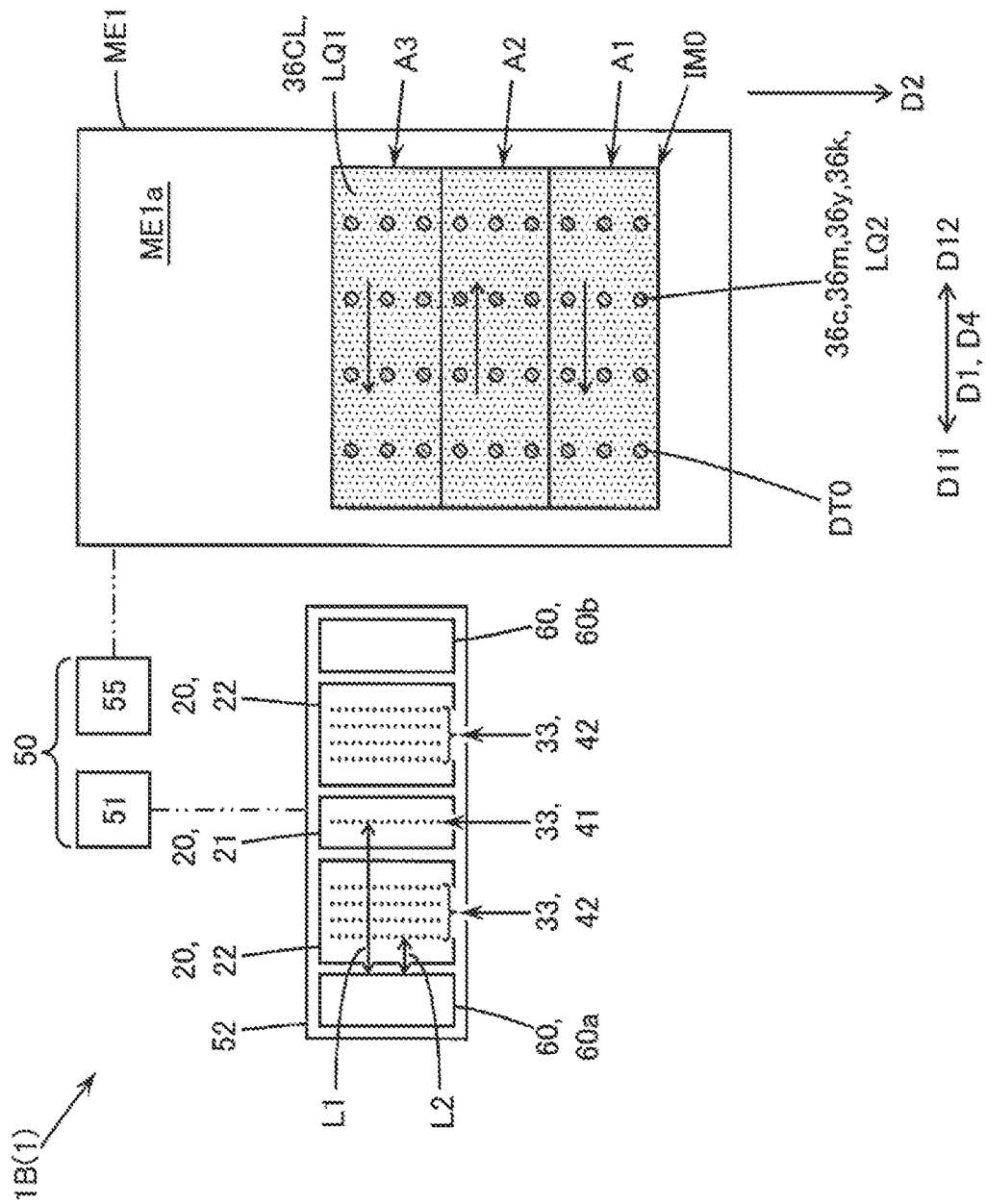
FIG. 7 is a plan view for schematically describing an example of operation of another printing apparatus of a serial type.

As illustrated in FIG. 5, FIG. 7, and the like, the driving unit 50 may change the relative position of the recording medium ME1 with respect to the ejection head 20 in a relative movement direction D4. Here, the relative movement direction D4 is a direction from the upstream side S1 toward the downstream side S2. The second nozzle row 42 may be disposed on the downstream side S2 of the first nozzle row 41. The irradiation unit 60 may be disposed on the downstream side S2 of the second nozzle row 42. For example, in the case of a line-type printing apparatus in which the recording medium ME1 moves in the feeding direction D2 with the ejection head 20 not moving, the relative movement direction D4 is the feeding direction D2 of the recording medium ME1. By disposing the first nozzle row 41, the second nozzle row 42, and the irradiation unit 60 in this order in the feeding direction D2, it is possible to irradiate the recording medium ME1 onto which the first liquid LQ1 and the second liquid LQ2 are deposited with light, and easily make the distance L1 between the irradiation unit 60 and the first nozzle row 41 longer than the distance L2 between the irradiation unit 60 and the second nozzle row 42. Further, even in the case of a serial-type printing apparatus in which the ejection head 20 is moved in the main scanning direction D1, the relative movement direction D4 can be applied in the main scanning direction D1. In this case, by disposing the first nozzle row 41, the second nozzle row 42, and the irradiation unit 60 in this order in the main scanning direction D1, it is possible to irradiate the recording medium ME1 on which the first liquid LQ1 and the second liquid LQ2 are deposited with light, and easily make the distance L1 between the irradiation unit 60 and the first nozzle row 41 longer than the distance L2 between the irradiation unit 60 and the second nozzle row 42. Accordingly, according to this aspect, it is possible to provide a preferred printing apparatus.

Aspect 7

As illustrated in FIG. 7, the driving unit 50 may change a relative position of the ejection head 20 with respect to the recording medium ME1 in the main scanning direction D1 and, when the first liquid LQ1 and the second liquid LQ2 are not ejected from the ejection head 20 toward the recording medium ME1, may change a relative position of the recording medium ME1 with respect to the ejection head 20 in the feeding direction D2 intersecting the main scanning direction D1. The irradiation unit 60, the second nozzle row 42, the first nozzle row 41, the second nozzle row 42, and the irradiation unit 60 may be disposed in this order in the main scanning direction D1. According to this aspect, it is possible to form an image on the recording medium ME1 by the main scanning in a forward direction and the main scanning in a backward direction, and thus provide a preferred printing apparatus of a serial type.

Aspect 8

Figure 10:
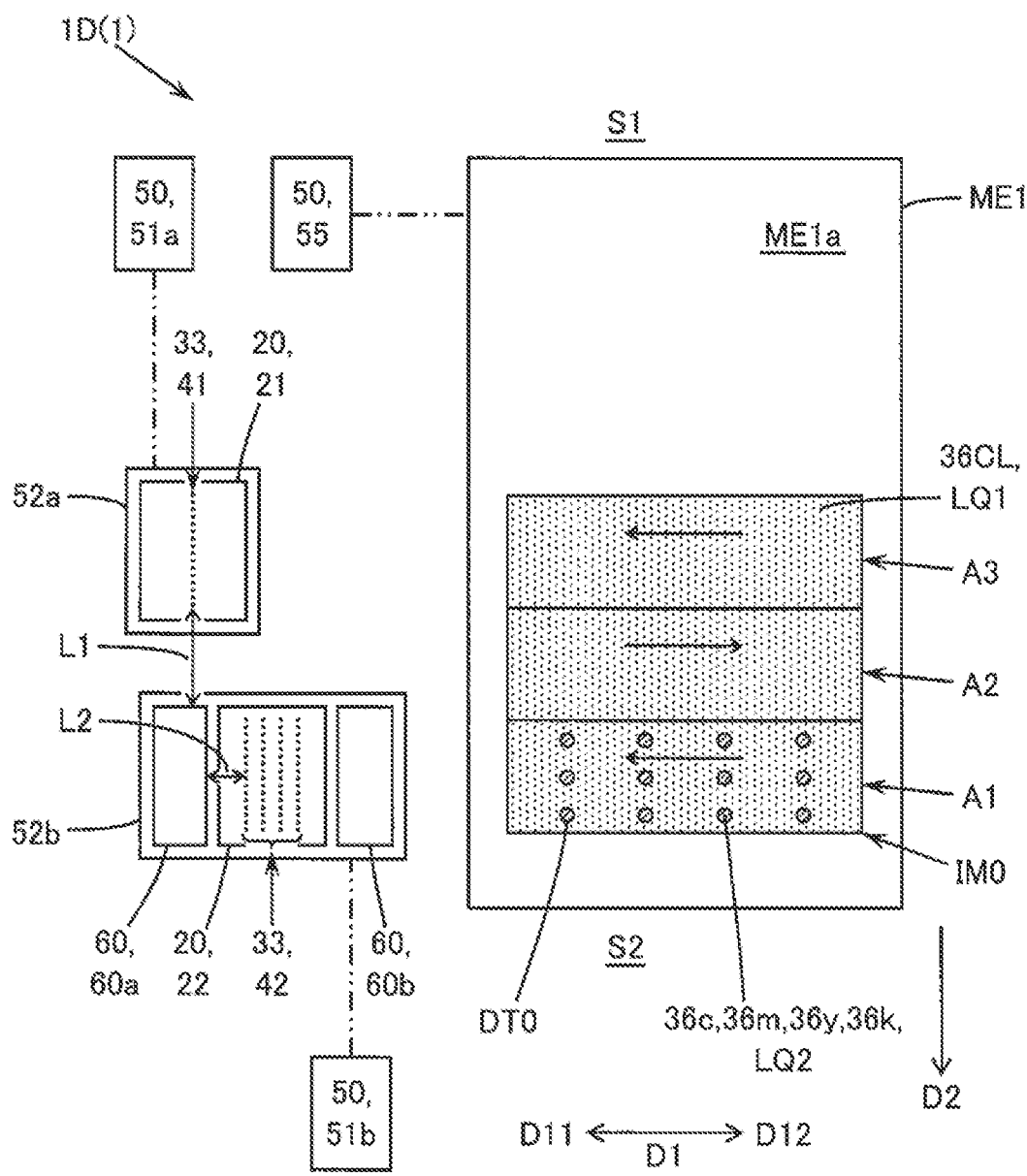
FIG. 10 is a plan view schematically illustrating an example of a printing apparatus of a serial type including a first carriage for a first head and a second carriage for a second head.

As illustrated in FIG. 10, the ejection head 20 may include a first head 21 including the first nozzle row 41 and a second head 22 including the second nozzle row 42. The driving unit 50 may include a first main scanning unit (first carriage driving unit 51a, for example) that includes a first carriage 52a on which the first head 21 is mounted and that is configured to change a relative position of the first carriage 52a with respect to the recording medium ME1 in the main scanning direction D1, and a second main scanning unit (second carriage driving unit 51b, for example) that includes a second carriage 52b, separate from the first carriage 52a, on which the second head 22 is mounted, and that is configured to change a relative position of the second carriage 52b with respect to the recording medium ME1 in the main scanning direction D1. According to this aspect, it is possible to provide a preferred printing apparatus of a serial type.

Aspect 9

Incidentally, a printing method according to an aspect of this technique is a printing method of the printing apparatus 1 including the ejection head 20 configured to eject, toward the recording medium ME1, a liquid that is cured by irradiation with light, the driving unit 50 configured to change relative positions of the ejection head 20 and the recording medium ME1, and the irradiation unit 60 configured to irradiate, with the light, the recording medium ME1, the ejection head 20 including the first nozzle row 41 and the second nozzle row 42. Here, the distance L1 between the irradiation unit 60 and the first nozzle row 41 is longer than the distance L2 between the irradiation unit 60 and the second nozzle row 42. This printing method includes the following steps (A) and (B).

(A) An ejecting step ST1 for ejecting, from the first nozzle row 41 toward the recording medium ME1, the first liquid LQ1 containing a photopolymerization initiator that initiates a polymerization reaction of a polymerizable compound by irradiation with the light, and ejecting, from the second nozzle row 42 toward the recording medium ME1, the second liquid LQ2 containing the polymerizable compound and a color material and not containing the photopolymerization initiator so that the second liquid LQ2 overlaps the first liquid LQ1 on the surface ME1a of the recording medium ME1.

(B) An irradiating step ST2 for irradiating, with the light, the recording medium ME1 onto which the first liquid LQ1 and the second liquid LQ2 are deposited.

According to this aspect, it is possible to provide a printing method that reduces ejection defects caused by the curing of a liquid containing a color material in the vicinity of a nozzle by light leaking from the irradiation unit.

Furthermore, this technique can be applied to a printing system including the printing apparatus described above, a printing method for the printing system, and the like. The printing apparatus may be constituted by a plurality of distributed portions.

2. Specific Example of Printing System Including Printing Apparatus

FIG. 1 schematically illustrates a printing system including a printing apparatus that uses UV ink as a liquid cured by irradiation with light. Ultraviolet light, abbreviated herein as UV, is an example of the light. The ink includes a liquid ink that does not contain a color material. A printing system SY1 illustrated in FIG. 1 includes a host device HO1 and the printing apparatus 1. Note that the printing system SY1 may include additional elements not illustrated in FIG. 1, and the printing apparatus 1 may include additional elements not illustrated in FIG. 1.

FIG. 1 illustrates, as the printing apparatus 1, a serial printer that is a type of UV inkjet printer. The printing apparatus 1 includes a controller 10, a nonvolatile memory 15, a RAM 16, a communication I/F 17, the ejection head 20, the driving unit 50, the irradiation unit 60, and the like. Here, RAM is an abbreviation for random access memory, and I/F is an abbreviation for interface. The controller 10, the nonvolatile memory 15, the RAM 16, and the communication I/F 17 are coupled to a bus and configured to input and output information to one another.

The nonvolatile memory 15 is a rewritable large-capacity memory that stores information necessary for the operation of the printing apparatus 1, such as firmware. The nonvolatile memory 15 may be a nonvolatile semiconductor memory such as a flash memory, a magnetic storage device such as a hard disk, or the like. The RAM 16 is a large-capacity volatile semiconductor memory, and stores input images and the like received from the host device HO1, an external memory (not illustrated), and the like. The communication I/F 17 is coupled to the host device HO1 in a wired or wireless manner, and outputs information to the host device HO1. The host device HO1 includes a computer such as a personal computer or a tablet terminal, a mobile phone such as a smart phone, a digital camera, a digital video camera, and the like.

The controller 10 includes a CPU 11, a memory 12 such as a ROM, and the like, and realizes a resolution conversion unit 13a, a color conversion unit 13b, a halftone processing unit 13c, a nozzle assignment unit 13d, a drive signal transmission unit 13e, and the like. CPU is an abbreviation for a central processing unit, RAM is an abbreviation for random access memory, and ROM is an abbreviation for read only memory. On the basis of image data corresponding to an output image IMO illustrated in FIG. 2, the controller 10 controls the main scanning and the sub scanning by the driving unit 50, the ejection of ink droplets 37 by the ejection head 20, and the irradiation of UV by the irradiation unit 60. The main scanning refers to the relative movement of the ejection head 20 and the recording medium ME1 in the main scanning direction, and the sub scanning refers to the relative movement of the ejection head 20 and the recording medium ME1 in the feeding direction D2. The controller 10 can be constituted by an SoC or the like. SoC is an abbreviation for system on a chip.

The CPU 11 is a device that centrally performs information processing and control in the printing apparatus 1.

The resolution conversion unit 13a converts the resolution of an input image from the host device HO1 or the like into a set resolution. The input image is expressed by, for example, original RGB data having integer values of multiple tones of R, G, and B in each pixel. Herein, R means red, G means green, and B means blue. The resolution conversion unit 13a converts the original RGB data into input color tone data DA1 of the set resolution. The input color tone data DA1 are expressed by, for example, RGB data having integer values of multiple tones of R, G, and B in each pixel. The number of tones of the RGB data and the original RGB data includes $2^8$, $2^{16}$, or the like.

The color conversion unit 13b converts the input color tone data DA1 into output color tone data DA2 having integer values of multiple tones of C, M, Y, and K in each pixel with reference to, for example, a color conversion look-up table that defines a correspondence relationship between the multiple tone values of R, G, and B and the multiple tone values of C, M, Y, and K. Herein, C means cyan, M means magenta, Y means yellow, and K means black. The number of tones of the output color tone data DA1 includes $2^8$, $2^{16}$, or the like. The output color tone data DA2 indicates the amount of ink 36 used for each pixel.

The halftone processing unit 13c performs predetermined halftone processing, such as a dither method, an error diffusion method, or a density pattern method, for example, on the tone values of each pixel constituting the output color tone data DA2, reducing the number of tones of the tone values and generating halftone data DA3. The halftone data DA3 indicates a formation status of the dots. The halftone data DA3 may be binary value data that indicates presence or absence of formation of dots, or may be multi-value data of three or more tones configured to correspond to dots of different sizes such as large, medium, and small dots. The binary value data can be set as data in which 1 corresponds to dot formation and 0 corresponds to no dot, for example. Four-value data can express the small, medium, and large dots using two bits each.

The nozzle assignment unit 13d performs nozzle assignment processing in which the halftone data DA3 is rearranged in the order in which the dots are formed by the driving unit 50, thereby generating nozzle data DA4. The nozzle assignment processing in a serial printer is also referred to as rasterization processing.

The drive signal transmission unit 13e generates a drive signal SG corresponding to a voltage signal applied to a driving element 32 of the ejection head 20 from the nozzle data DA4 and outputs the drive signal SG to a driving circuit 31. For example, when the nozzle data DA4 indicates "dot formation", the drive signal SG for ejecting the ink droplet 37 for dot formation is output. Further, in a case in which the nozzle data DA4 is four-value data, the drive signal SG for ejecting the ink droplet 37 in accordance with each of the small, medium, and large dots is output.

The units 13a to 13e may be constituted by ASICs, may directly read data to be processed from the RAM 16, or may directly write processed data to the RAM 16. Here, ASIC is an abbreviation for application specific integrated circuit. Further, the printing apparatus 1 may receive any of the input color tone data DA1, the output color tone data DA2, the halftone data DA3, and the nozzle data DA4 from the host device HO1 to generate the drive signal SG.

The driving unit 50 controlled by the controller 10 includes a carriage driving unit 51, a carriage 52, a roller driving unit 55, a transport roller pair 56, a discharge roller pair 57, a platen 58, and the like. The ejection head 20 and the irradiation unit 60 are mounted on the carriage 52. The driving unit 50 reciprocates the carriage 52 by the driving of the carriage driving unit 51, and feeds the recording medium ME1 in the feeding direction D2 along a transport path 59 by the driving of the roller driving unit 55. Here, the feeding direction D2 is a direction from the upstream side S1 toward the downstream side S2. In FIG. 1, the feeding direction D2 is rightward, the upstream side S1 is the left side, and the downstream side S2 is the right side. The carriage driving unit 51 performs the main scanning in which the carriage 52 is moved in the main scanning direction D1 illustrated in FIG. 2 and the like in accordance with the control of the controller 10. As illustrated in FIG. 2, the main scanning direction D1 collectively refers to a forward direction D11 and a backward direction D12, which is opposite to the forward direction D11. The roller driving unit 55 rotates rollers 56a, 57a of the roller pairs 56, 57 in accordance with the control of the controller 10, thereby performing sub scanning that feeds the recording medium ME1 in the feeding direction D2. A material of the recording medium ME1 is not particularly limited, and a variety of materials are conceivable, such as a resin, a metal, or paper. A shape of the recording medium ME1 is also not particularly limited, a variety of shapes are conceivable, such as rectangular shape or a roll shape, and the shape may be three-dimensional.

The carriage 52 on which the ejection head 20 and the irradiation unit 60 are mounted may be equipped with an ink cartridge 35 in which the ink 36 to be ejected as the ink droplet 37 is supplied to the ejection head 20. Of course, the ink 36 may be supplied to the ejection head 20 from the ink cartridge 35 installed outside the carriage 52 via a tube. The carriage 52 is fixed to an endless belt (not illustrated) and is movable along a guide 53 in the main scanning direction D1 illustrated in FIG. 2 and the like. The guide 53 is a long member with a longitudinal direction thereof in the main scanning direction D1. The carriage driving unit 51 is constituted by a servo motor and moves the carriage 52 in the forward direction D11 and the backward direction D12 in accordance with commands from the controller 10.

The transport roller pair 56 upstream of the ejection head 20 includes the driving transport roller 56a that comes into contact with one surface of the recording medium ME1, and a driven transport roller 56b that comes into contact with the other surface of the recording medium ME1. During the sub scanning, the transport roller pair 56 feed the nipped recording medium ME1 toward the ejection head 20 and the irradiation unit 60 by rotation of the driving transport roller 56a.

The discharge roller pair 57 downstream of the ejection head 20 include the driving discharge roller 57a that comes into contact with one surface of the recording medium ME1, and a driven discharge roller 57b that comes into contact with the other surface of the recording medium ME1. During sub scanning, the ejection roller pair 57 transport the nipped recording medium ME1 toward a discharge tray (not illustrated) by rotation of the driving discharge roller 57a.

The roller driving unit 55 is constituted by a servo motor, and rotates the rollers 56a, 57a in accordance with commands from the controller 10. The rollers 56a, 57a are rotated, feeding the recording medium ME1 in the feeding direction D2.

The platen 58 supports the recording medium ME1 in the transport path 59. The ejection head 20 controlled by the controller 10 ejects the ink droplet 37 toward the recording medium ME1 supported by the platen 58, depositing the ink 36 onto the recording medium ME1. The irradiation unit 60 controlled by the controller 10 irradiates UV toward the ink 36 deposited onto the recording medium ME1, thereby curing the ink 36 deposited onto the recording medium ME1.

As illustrated in FIG. 2, the ejection head 20 includes the first head 21 including the first nozzle row 41 and the second head 22 including the second nozzle row 42. Details of the first head 21 and the second head 22 will be described below. The ejection head 20 includes a nozzle row 33 including a plurality of nozzles 34 on a nozzle surface 20a, and is provided with the driving circuit 31, the driving element 32, and the like. The nozzle surface 20a is an ejection surface of the ink droplets 37 as droplets. The driving circuit 31 applies a voltage signal to the driving element 32 in accordance with the drive signal SG input from the drive signal transmission unit 13e. As the driving element 32, a piezoelectric element that applies pressure to the ink 36 in a pressure chamber communicating with the nozzles 34 can be used, a driving element that generates air bubbles in a pressure chamber by heat to eject the ink droplets 37 from the nozzles, or the like can be used. The nozzles are each a small hole through which the ink droplets 37 are sprayed. The ink 36 is supplied from the ink cartridge 35 to a pressure chamber of the ejection head 20. A combination of the ink cartridge 35 and the nozzle row 33 is provided for each of CL, C, M, Y, and K, for example. Here, CL means clear, and CL ink means clear ink of the first liquid LQ1. The ink 36 in the pressure chamber is ejected as the ink droplets 37 from the nozzles 34 toward the recording medium ME1 by the driving element 32. In this way, dots of the ink droplets 37 are formed on the recording medium ME1.

FIG. 2 is a plan view schematically illustrating operation of the printing apparatus 1 of a serial type. FIG. 3 is a bottom view schematically illustrating a configuration of the ejection head 20 and the irradiation unit 60.

The first head 21, the second head 22, and a plurality of the irradiation units 60 are mounted on the carriage 52 illustrated in FIGS. 2 and 3. The second head 22 and the plurality of irradiation units 60 are disposed on the downstream side S2 of the first head 21. The plurality of irradiation units 60 include a first irradiation unit 60a in a position in the forward direction D11 from the second head 22, and a second irradiation unit 60b in a position in the backward direction D12 from the second head 22.

The first head 21 includes the first nozzle row 41 including a plurality of nozzles 34a arranged side by side at intervals of a nozzle pitch Np on the nozzle surface 20a in a nozzle arrangement direction D3. The nozzle 34a ejects, as the ink droplet 37, a clear ink 36CL of the first liquid LQ1. The clear ink 36CL contains, as UV ink components, a polymerizable compound and a photopolymerization initiator that initiates a polymerization reaction of the polymerizable compound by irradiation with UV, but does not contain a color material. Thus, the clear ink 36CL is a generally colorless, transparent liquid.

The second head 22 includes a plurality of the second nozzle rows 42, each including a plurality of nozzles 34b arranged side by side at intervals at the nozzle pitch Np on the nozzle surface 20a in the nozzle arrangement direction D3. The nozzle 34b ejects, as the ink droplet 37, the second liquid LQ2 containing a pigment as a color material. The second liquid LQ2 includes a cyan ink 36c containing cyan pigments, a magenta ink 36m containing magenta pigments, a yellow ink 36y containing yellow pigments, and a black ink 36k containing black pigments. Note that these inks may be referred to as color inks 36c, 36m, 36y, 36k. The second liquid LQ2 contains the polymerizable compound as a UV ink component, but does not contain the photopolymerization initiator. The second head 22 includes, as the second nozzle rows 42, a magenta nozzle row including a plurality of the nozzles 34b that eject the magenta ink 36m, a cyan nozzle row including a plurality of the nozzles 34b that eject the cyan ink 36c, a yellow nozzle row including a plurality of the nozzles 34b that eject a yellow ink 36y, and a black nozzle row including a plurality of the nozzles 34b that eject the black ink 36k.

Note that the ejection heads 20 collectively refers to the first head 21 and the second head 22, the nozzle rows 33 collectively refers to the first nozzle row 41 and the second nozzle rows 42, and the nozzles 34 collectively refers to the nozzles 34a, 34b.

The nozzle alignment direction D3 may be orthogonal to the main scanning direction D1 as illustrated in FIG. 3, or may not be orthogonal but rather obliquely intersecting the main scanning direction D1. In other words, the nozzle alignment direction D3 may match the feeding direction D2 as illustrated in FIG. 3, or may deviate from the feeding direction D2 within a range of less than 90°. The plurality of nozzles 34 included in the nozzle rows 33 may be arranged in a single row as illustrated in FIG. 3, or may be arranged in a staggered manner.

Each irradiation unit 60 includes a housing 61 including an opening facing the recording medium ME1, and a light source 62 disposed in an interior space of the housing 61 in an orientation facing the recording medium ME1. The light source 62 emits UV having a peak wavelength near 360 to 420 nm, such as 395 nm, for example. The UV emitted from the light source 62 is irradiated from the opening of the housing 61 toward the recording medium ME1. Although the light source 62 is preferably a light-emitting diode, that is, an LED, a metal halide lamp or the like can be used.

The first irradiation unit 60a and the second irradiation unit 60b are disposed at positions in the forward direction D11 and the backward direction D12, respectively, from the second nozzle rows 42 on the downstream side S2 of the first nozzle row 41, and thus the irradiation units 60 are in positions configured to irradiate light toward the second liquid LQ2 deposited onto the recording medium ME1.

As illustrated in FIGS. 2 and 3, the distance L1 between the irradiation unit 60 and the first nozzle row 41 is longer than the distance L2 between the irradiation unit 60 and the second nozzle row 42. Herein, the distance L1 is a distance between the irradiation unit 60 and, among the plurality of nozzles 34a included in the first nozzle row 41, a nozzle having a shortest distance from the irradiation unit 60 in a state in which the irradiation unit 60 and the first nozzle row 41 are projected on a plane in the main scanning direction D1 and the feeding direction D2. The distance L2 is a distance between the irradiation unit 60 and, among the plurality of nozzles 34b included in the second nozzle rows 42, a nozzle having a shortest distance from the irradiation unit 60 in a state in which the irradiation unit 60 and the second nozzle rows 42 are projected on a plane in the main scanning direction D1 and the feeding direction D2.

The printing apparatus 1 illustrated in FIG. 2 performs bidirectional printing in which the ink droplets 37 are ejected from the ejection heads 20 when the carriage 52 is moved in the forward direction D11 and the backward direction D12. The carriage 52 and the recording medium ME1 operate, for example, as follows.

In the first main scanning, the carriage 52 moves in the forward direction D11 by the driving of the carriage driving unit 51. The ejection heads 20 eject the ink droplets 37 toward the recording medium ME1 when moving in the forward direction D11. In the example illustrated in FIG. 2, the first head 21 ejects the clear ink 36CL from the first nozzle row 41 to an area A1 most downstream of the surface ME1a of the recording medium ME1. The clear ink 36CL is ejected as the ink droplet 37 from each nozzle 34a and, to ensure that the clear ink 36CL is not ejected in a manner that causes a gap to occur in the area A1, the clear ink 36CL is applied to the entire surface of the area A1. After ejection of the ink droplets 37 is completed in the first main scanning, the recording medium ME1 moves in the sub scanning in the feeding direction D2 by the driving of the roller driving unit 55 in an amount equivalent to one band.

In the second main scanning, the carriage 52 moves in the backward direction D12 by the driving of the carriage driving unit 51. The ejection head 20 ejects the ink droplets 37 toward the recording medium ME1 when moving in the backward direction D12. In the example illustrated in FIG. 2, the first head 21 ejects the clear ink 36CL from the first nozzle row 41 in an area A2 that continues from the area A1 to the upstream side S1. Here again, the clear ink 36CL is applied to the entire surface of the area A2. After ejection of the ink droplets 37 is completed in the second main scanning, the recording medium ME1 moves in the sub scanning in the feeding direction D2 by the driving of the roller driving unit 55 in an amount equivalent to one band.

In the third main scanning, the carriage 52 moves in the forward direction D11 by the driving of the carriage driving unit 51. The ejection head 20 ejects the ink droplets 37 toward the recording medium ME1 when moving in the forward direction D11. In the example illustrated in FIG. 2, the first head 21 ejects the clear ink 36CL from the first nozzle row 41 to an area A3 that continues from the area A2 to the upstream side S1, and the second head 22 ejects the second liquid LQ2 from the second nozzle rows 42 to the area A1 most downstream. The second liquid LQ2 is ejected in accordance with the nozzle data DA4 illustrated in FIG. 1. When the cyan ink 36c is ejected from the nozzle 34b, a dot DT0 of C is formed in the area A1; when the magenta ink 36m is ejected from the nozzle 34b, the dot DT0 of M is formed in the area A1; when the yellow ink 36y is ejected from the nozzle 34b, the dot DT0 of Y is formed in the area A1; and when the black ink 36k is ejected from the nozzle 34b, the dot DT0 of K is formed in the area A1. Accordingly, the first liquid LQ1 and the second liquid LQ2 are ejected from the ejection heads 20 so that the second liquid LQ2 overlaps the first liquid LQ1 on the surface ME1a of the recording medium ME1. Further, in the third main scanning, the controller 10 turns off the light source 62 of the first irradiation unit 60a and turns on the light source 62 of the second irradiation unit 60b, thereby irradiating UV from the second irradiation unit 60b toward the area A1. The area A3 is not irradiated with the UV from the second irradiation unit

60b. Accordingly, in the third main scanning, an area of the recording medium ME1 configured to be irradiated by the irradiation units 60 includes the area A1 where the second liquid LQ2 is configured to be ejected from the second nozzle rows 42 and does not include the area A3 where the first liquid LQ1 is configured to be ejected from the first nozzle row 41.

After ejection of the ink droplets 37 is completed in the third main scanning, the recording medium ME1 moves in the sub scanning in the feeding direction D2 by the driving of the roller driving unit 55 in an amount equivalent to one band.

In the fourth main scanning, the carriage 52 moves in the backward direction D12 by the driving of the carriage driving unit 51. The ejection heads 20 eject the ink droplets 37 toward the recording medium ME1 when moving in the backward direction D12. In the example illustrated in FIG. 2, the first head 21 ejects the clear ink 36CL from the first nozzle row 41 to an area (not illustrated) that continues from the area A3 to the upstream side S1, and the second head 22 ejects the second liquid LQ2 from the second nozzle rows 42 to the area A2. Further, in the fourth main scanning, the controller 10 turns off the light source 62 of the second irradiation unit 60b and turns on the light source 62 of the first irradiation unit 60a, thereby irradiating UV from the first irradiation unit 60a toward the area A2. Accordingly, in the fourth main scanning, an area of the recording medium ME1 configured to be irradiated by the irradiation units 60 includes the area A2 on which the second nozzle rows 42 is configured to eject the second liquid LQ2 and does not include the area on which the first nozzle row 41 is configured to eject the first liquid LQ1.

After ejection of the ink droplets 37 is completed in the fourth main scanning, the recording medium ME1 moves in the sub scanning in the feeding direction D2 by the driving of the roller driving unit 55 in an amount equivalent to one band.

Hereafter, the main scanning and the sub scanning in which the carriage 52 moves in the forward direction D11, and the main scanning and the sub scanning in which the carriage 52 moves in the backward direction D12 are repeated.

As described above, the carriage driving unit 51 changes relative positions of the ejection heads 20 with respect to the recording medium ME1 in the main scanning direction D1 and, when the first liquid LQ1 and the second liquid LQ2 are not ejected from the ejection heads 20 toward the recording medium ME1, the roller driving unit 55 changes a relative position of the recording medium ME1 with respect to the ejection heads 20 in the feeding direction D2. The ejection head 20 ejects the first liquid LQ1 and the second liquid LQ2 during the main scanning.

Next, examples of compositions of the first liquid LQ1 and the second liquid LQ2 will be described.

The first liquid LQ1 contains a photopolymerization initiator. The first liquid LQ1 may contain a polymerizable compound as in the clear ink 36CL described above, or may not contain a polymerizable compound. Further, the first liquid LQ1 may not contain a color material as in the clear ink 36CL, or may contain a color material. For example, when the first liquid LQ1 contains a resin component, the cured resin may yellow due to changes over time. In this case, the yellowing can be made not noticeable by adding a blue color material to the first liquid LQ1 in advance. In this example, the blue color material is an example of a second color material. On the other hand, the second liquid LQ2 contains a polymerizable compound and a color material and does not contain a photopolymerization initiator.

The polymerizable compound is polymerized by the action of the photopolymerization initiator to cure the ink containing the first liquid LQ1 and the second liquid LQ2. As the polymerizable compound, various (meth)acrylate monomers, various (meth)acrylate oligomers, various vinyl monomers, various vinyl ether monomers, and the like can be used, and the (meth)acrylic acid esters (denoted as monomer A) containing a vinyl ether group shown in general formula (1) below can be used.

$$CH_2=CR^1—COOR^2—O—CH=CH—R^3 \qquad (1)$$

where, $R^1$ is a hydrogen atom or a methyl group, $R^2$ is a bivalent organic residue having from 2 to 20 carbon atoms, $R^3$ is a hydrogen atom or a monovalent organic residue having from 1 to 11 carbon atoms. As the monomer A, the various types of monomers disclosed in JP-A-2014-195889 can be used. The content of the polymerizable compound in the first liquid LQ1 and the second liquid LQ2 can be, for example, about from 60 to 95% by mass.

The photopolymerization initiator initiates the polymerization reaction of the polymerizable compound by irradiation with UV. As the photopolymerization initiator, an alkylphenone-based photopolymerization initiator, an acylphosphine-based photopolymerization initiator, a titanocene-based photopolymerization initiator, a thioxanthone-based photopolymerization initiator, or the like can be used. The content of the photopolymerization initiator in the first liquid LQ1 can be, for example, about from 9 to 14% by mass.

As the color material, a pigment such as an inorganic pigment or an organic pigment or the like can be used. As the inorganic pigment, a metal oxide such as carbon black, iron oxide, titanium oxide, or the like can be used. As the organic pigment, azo pigments such as monoazo-based azo pigments and disazo-based azo pigments, condensed polycyclic pigments such as phthalocyanine pigments, perylene pigments, perinone pigments, anthraquinone pigments, lake pigments such as dyed lake pigments, fluorescent pigments, and the like can be used. The average particle size of the pigment according to the dynamic light scattering method can be, for example, about from 30 to 2000 nm. The color material added to the first liquid LQ1 and the second liquid LQ2 may be one type, or may be two or more types. The content of the color material in the color inks 36c, 36m, 36y, 36k can be, for example, about from 1.5 to 6% by mass.

Note that the first liquid LQ1 and second liquid LQ2 may contain additives such as dispersants, surfactants also called leveling agents, polymerization inhibitors, polymerization accelerators, penetration accelerators, and wetting agents, as needed.

However, when a UV irradiation unit is provided in the vicinity of an ejection head that ejects UV ink including a photopolymerization initiator and a polymerizable compound from a nozzle surface, an ejection defect may occur in which the UV ink is cured on the nozzle surface by the UV leaking from the irradiation unit, clogging the nozzles. When the UV ink deposited onto the nozzle surface is excessively cured, a situation occurs in which the UV ink cannot be easily removed from the nozzle surface even when the maintenance of wiping off the UV ink from the ejection surface is performed.

In this specific example, the second nozzle rows 42 that eject the second liquid LQ2 containing a polymerizable compound and a color material and not containing a photopolymerization initiator are provided in the ejection heads 20, and the first nozzle row 41 that ejects the first liquid LQ1 containing a photopolymerization initiator is farther from the irradiation unit 60 than the second nozzle rows 42. As illustrated in FIGS. 2 and 3, the distance L1 between the irradiation unit 60 and the first nozzle row 41 is longer than the distance L2 between the irradiation unit 60 and the second nozzle rows 42. This reduces the ejection defects caused by the curing of the liquid containing the color material in the vicinity of the nozzles due to the UV leaking from the irradiation unit 60.

Figure 4:
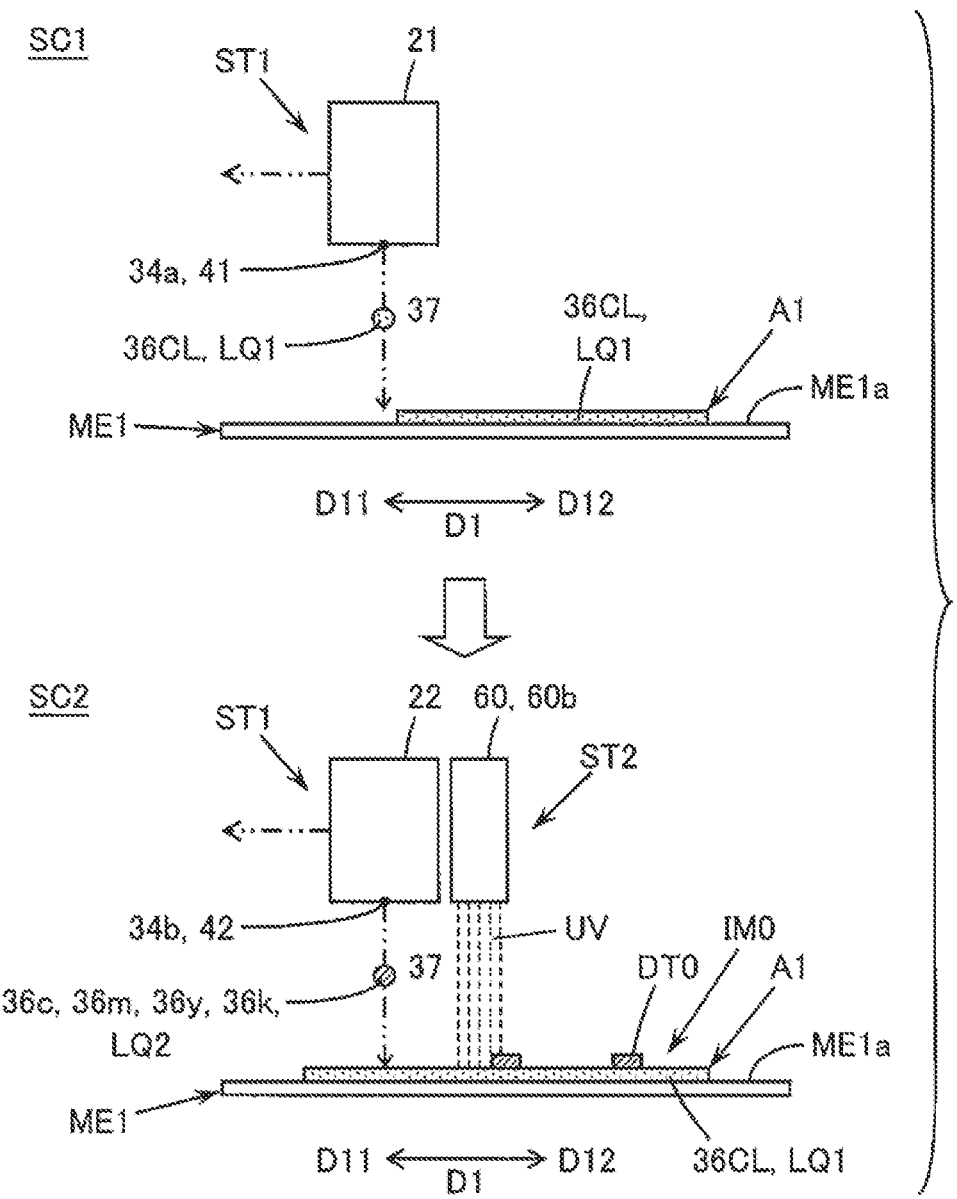
FIG. 4 is a diagram schematically illustrating action of the printing apparatus of a serial type.

3. Action and Effect of Serial-Type Printing Apparatus According to Specific Example FIG. 4 schematically illustrates the action of the printing apparatus 1 of a serial type illustrated in FIGS. 1 and 2. A main scanning SC1 illustrated in the upper portion of FIG. 4 corresponds to the first main scanning illustrated in FIG. 2. A main scanning SC2 illustrated in the lower portion of FIG. 4 corresponds to the third main scanning illustrated in FIG. 2. FIG. 4 illustrates the state of the area A1 of the surface ME1a of the recording medium ME1.

In the first main scanning SC1, the first head 21 mounted on the carriage 52 moves in the forward direction D11 and, during the movement, the ink droplets 37 of the clear ink 36CL as the first liquid LQ1 are ejected from the nozzles 34a of the first nozzle row 41 toward the area A1. The clear ink 36CL contains a photopolymerization initiator and a polymerizable compound, and may contain a second color material. In the first main scanning SC1, the clear ink 36CL is applied to the entire surface of the area A1. After ejection of the clear ink 36CL is completed, the sub scanning, the main scanning in the backward direction D12, and the sub scanning are performed.

In the second main scanning SC2, the second head 22 and the irradiation unit 60 mounted on the carriage 52 move in the forward direction D11 and, during the movement, the ink droplets 37 of the second liquid LQ2 are ejected from the nozzles 34b of the second nozzle row 42 toward the area A1. The second liquid LQ2 contains a polymerizable compound and a color material and does not contain a photopolymerization initiator and, in this example, includes at least a portion of the color inks 36c, 36m, 36y, 36k. The dot DT0 of the second liquid LQ2 overlaps the clear ink 36CL on the surface ME1a of the recording medium ME1. Accordingly, the first liquid LQ1 and the second liquid LQ2 are ejected from the ejection heads 20 and thus the second liquid LQ2 overlaps the first liquid LQ1 on the surface ME1a of the recording medium ME1. In an area where the main scanning in the backward direction D12 is performed an in the area A2, the second liquid LQ2 overlaps the first liquid LQ1 on the surface ME1a of the recording medium ME1 in the same way, only the movement directions of the first head 21 and second head 22 are different.

As described above, the ejecting step ST1 for ejecting the first liquid LQ1 from the first nozzle row 41 toward the recording medium ME1, ejecting the second liquid LQ2 from the second nozzle rows 42 toward the recording medium ME1, and overlapping the first liquid LQ1 with the second liquid LQ2 on the surface ME1a of the recording medium ME1 is performed.

Here, the controller 10 illustrated in FIG. 1, in the second main scanning SC2, turns off the first irradiation unit 60a in a position in the forward direction D11 from the second head 22, and turns on the second irradiation unit 60b in a position in the backward direction D12 from the second head 22. As a result, UV is irradiated from the second irradiation unit 60b toward the area A1 where the clear ink 36CL and the color inks 36c, 36m, 36y, 36k are deposited onto the recording medium ME1, curing the clear ink 36CL and the color inks 36c, 36m, 36y, 36k, and forming an output image IMO on the recording medium ME1. Note that, in an area where the main scanning is performed in the backward direction D12 as in the area A2, the second irradiation unit 60b turns off, and the first irradiation unit 60a turns on, irradiating UV.

As described above, the irradiating step ST2 for irradiating UV toward the recording medium ME1 onto which the first liquid LQ1 and the second liquid LQ2 are deposited is performed.

Note that, the time from ejection of the color inks 36c, 36m, 36y, 36k to UV irradiation is shorter than the time from ejection of the clear ink 36CL to UV irradiation, and thus the output image IMO having high quality is formed.

The color inks 36c, 36m, 36y, 36k ejected from the second nozzle rows 42 relatively close to the irradiation units 60 contain a polymerizable compound and a color material, while not containing a photopolymerization initiator. This suppresses the curing of the color inks 36c, 36m, 36y, 36k in the vicinity of the second nozzle row 42 even when UV leaking from the irradiation units 60 enters the vicinity of the second nozzle rows 42.

The clear ink 36CL ejected from the first nozzle row 41 relatively far from the irradiation units 60 contains the photopolymerization initiator. When the color inks 36c, 36m, 36y, 36k overlap the clear ink 36CL on the surface ME1a of the recording medium ME1, the photopolymerization initiator initiates the polymerization reaction of the polymerizable compound in the clear ink 36CL by the UV irradiated from the irradiation units 60, and the polymerization reaction of the polymerizable compound in the clear ink 36CL promotes the polymerization reaction of the polymerizable compound in the color inks 36c, 36m, 36y, 36k. As a result, the clear ink 36CL and the color inks 36c, 36m, 36y, 36k quickly cure. The first nozzle row 41 that ejects the clear ink 36CL is relatively far from the irradiation units 60, and thus UV leaking from the irradiation units 60 does not readily enter the vicinity of the first nozzle row 41. As a result, the curing of the clear ink 36CL is suppressed in the vicinity of the first nozzle row 41. Accordingly, according to this specific example, it is possible to reduce ejection defects caused by the curing of the UV ink in the vicinity of the nozzles by the UV leaking from the irradiation units 60.

As a result, according to this specific example, it is possible to reduce the cost of maintenance of wiping off the cured UV ink from the nozzle surface. Further, according to this specific example, it is possible to increase the amount of UV irradiated onto the recording medium ME1, and thus improve print efficiency, thereby reducing the running costs of printing.

4. Example of Application to Line-Type Printing Apparatus

FIG. 5 is a plan view schematically illustrating operation of a printing apparatus 1A of a line type. The printing apparatus 1A is included in the concept of the printing apparatus 1.

With reference to FIGS. 1 and 5, the printing apparatus 1A such as a line printer does not include the carriage 52, and ejects the ink droplets 37 from the nozzle rows 33 toward the recording medium ME1 while the recording medium ME1 is moved in the feeding direction D2 without moving the ejection heads 20. For convenience, the main scanning direction D1 is illustrated in FIG. 5. This main scanning direction D1 corresponds to a width direction of the recording medium ME1 orthogonal to the feeding direction D2. The ejection heads 20 include the nozzle rows 33 in which the nozzles 34 are aligned across substantially the entire recording medium ME1 in the width direction described above. The roller driving unit 55 of the driving unit 50 moves the recording medium ME1 in the feeding direction D2. In this case, the feeding direction D2 is an example of the relative movement direction D4, and the roller driving unit 55 changes the relative position of the recording medium ME1 with respect to the ejection head 20 in the relative movement direction D4.

Here, the feeding direction D2 is a direction from the upstream side S1 toward the downstream side S2. In the printing apparatus 1A illustrated in FIG. 5, the first head 21 including the first nozzle row 41 that ejects the clear ink 36CL, the second head 22 including the second nozzle rows 42 that eject the color inks 36c, 36m, 36y, 36k, and the irradiation unit 60 are disposed in this order in the feeding direction D2. In other words, the second nozzle rows 42 are disposed on the downstream side S2 of the first nozzle row 41, and the irradiation unit 60 is disposed on the downstream side S2 of the second nozzle rows 42. Accordingly, the distance L1 between the irradiation unit 60 and the first nozzle row 41 is longer than the distance L2 between the irradiation unit 60 and the second nozzle rows 42.

Figure 6:
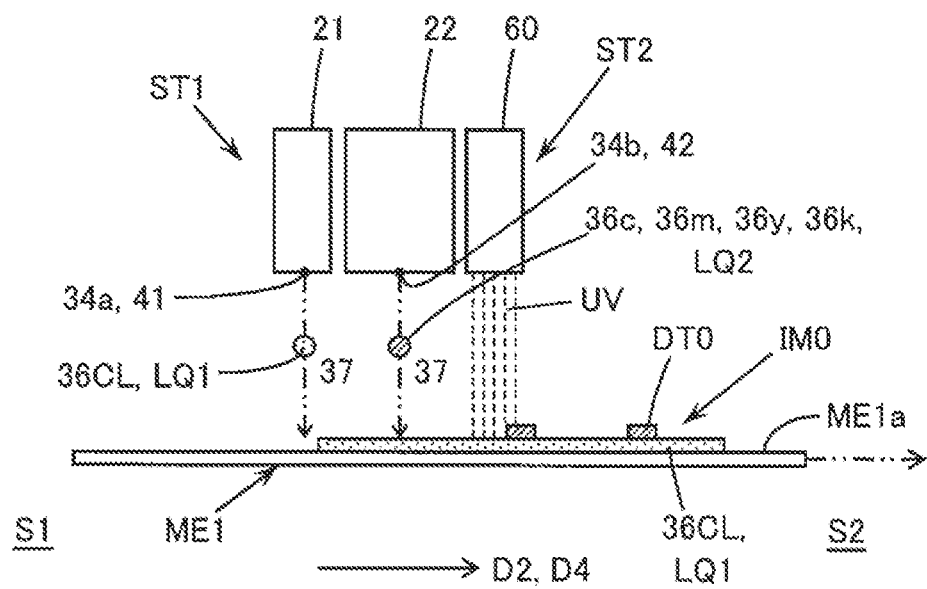
FIG. 6 is a diagram schematically illustrating action of the printing apparatus of a line type.

FIG. 6 schematically illustrates the action of the printing apparatus 1A of a line type illustrated in FIG. 5.

The recording medium ME1 moves in the feeding direction D2 and, during the movement, the ink droplets 37 of the clear ink 36CL are ejected from the nozzles 34a of the first nozzle row 41 toward the recording medium ME1, thereby applying the clear ink 36CL to substantially the entire surface of the surface ME1a. The clear ink 36CL contains a photopolymerization initiator and a polymerizable compound. Further, during the movement of the recording medium ME1, the ink droplets 37 of the color inks 36c, 36m, 36y, 36k are ejected from the nozzles 34b of the second nozzle rows 42 toward the recording medium ME1, causing the dots DT0 of the color inks 36c, 36m, 36y, 36k to overlap the clear ink 36CL on the surface ME1a. The color inks 36c, 36m, 36y, 36k contain a polymerizable compound and a color material and does not contain a photopolymerization initiator.

Thus, the ejecting step ST1 is implemented.

Furthermore, during the movement of the recording medium ME1, UV is irradiated from the irradiation unit 60 toward the surface ME1a of the recording medium ME1 onto which the clear ink 36CL and the color inks 36c, 36m, 36y, 36k are deposited. As a result, the clear ink 36CL and the color inks 36c, 36m, 36y, 36k are cured, and the output image IMO is formed on the recording medium ME1.

Thus, the irradiating step ST2 is implemented.

Note that the clear ink 36CL is ejected and subsequently the color inks 36c, 36m, 36y, 36k are ejected, and thus the output image IMO having a high image quality is formed.

The color inks 36c, 36m, 36y, 36k ejected from the second nozzle rows 42 relatively close to the irradiation unit 60 do not contain a photopolymerization initiator, and thus the curing of the color inks 36c, 36m, 36y, 36k in the vicinity of the second nozzle rows 42 is suppressed. Further, by overlapping the clear ink 36CL containing the photopolymerization initiator and the polymerizable compound with the color inks 36c, 36m, 36y, 36k, the photopolymerization initiator initiates the polymerization reaction of the polymerizable compound, curing the clear ink 36CL and the color inks 36c, 36m, 36y, 36k. Accordingly, the printing apparatus 1A of a line type can also reduce ejection defects caused by the curing of the UV ink in the vicinity of the nozzles by the UV leaking from the irradiation unit 60.

5. Example of Application to Another Serial-Type Printing Apparatus

FIG. 7 is a plan view schematically illustrating operation of another printing apparatus 1B of a serial type. The printing apparatus 1B is also included in the concept of the printing apparatus 1.

In the carriage 52 illustrated in FIG. 7, the first irradiation unit 60a, the second nozzle rows 42, the first nozzle row 41, the second nozzle rows 42, and the second irradiation unit 60b are disposed in this order in the main scanning direction D1.

In the main scanning in which the carriage driving unit 51 moves the carriage 52 in the forward direction D11, the controller 10 does not use the second head 22 in a position in the forward direction D11 from the first head 21, turns off the first irradiation unit 60a, and turns on the second irradiation unit 60b. In the main scanning in the forward direction D11, the first head 21 ejects the clear ink 36CL from the first nozzle row 41 in a certain area of the recording medium ME1, and the second head 22 ejects the color inks 36c, 36m, 36y, 36k from the second nozzle rows 42 in the same area. In the example illustrated in FIG. 7, the clear ink 36CL and the color inks 36c, 36m, 36y, 36k are ejected to the area A1 in the first main scanning, and are ejected to the area A3 in the third main scanning. During the main scanning in the forward direction D11, the backward direction D12 is the relative movement direction D4 in which the relative position of the recording medium ME1 changes with respect to the ejection head 20. In the carriage 52, the first nozzle row 41 that ejects the first liquid LQ1, the second nozzle rows 42 that eject the second liquid LQ2, and the second irradiation unit 60b are disposed in this order in the relative movement direction D4.

In the main scanning in which the carriage driving unit 51 moves the carriage 52 in the backward direction D12, the controller 10 does not use the second head 22 in a position in the backward direction D12 from the first head 21, turns off the second irradiation unit 60b, and turns on the first irradiation unit 60a. In the main scanning in the backward direction D12, the first head 21 ejects the clear ink 36CL from the first nozzle row 41 in a certain area of the recording medium ME1, and the second head 22 ejects the color inks 36c, 36m, 36y, 36k from the second nozzle rows 42. In the example illustrated in FIG. 7, the clear ink 36CL and the color inks 36c, 36m, 36y, 36k are ejected to the area A2 in the second main scanning. During the main scanning in the backward direction D12, the forward direction D11 is the relative movement direction D4 in which the relative position of the recording medium ME1 changes with respect to the ejection head 20. In the carriage 52, the first nozzle row 41 that ejects the first liquid LQ1, the second nozzle rows 42 that eject the second liquid LQ2, and the first irradiation unit 60a are disposed in this order in the relative movement direction D4.

Figure 8:
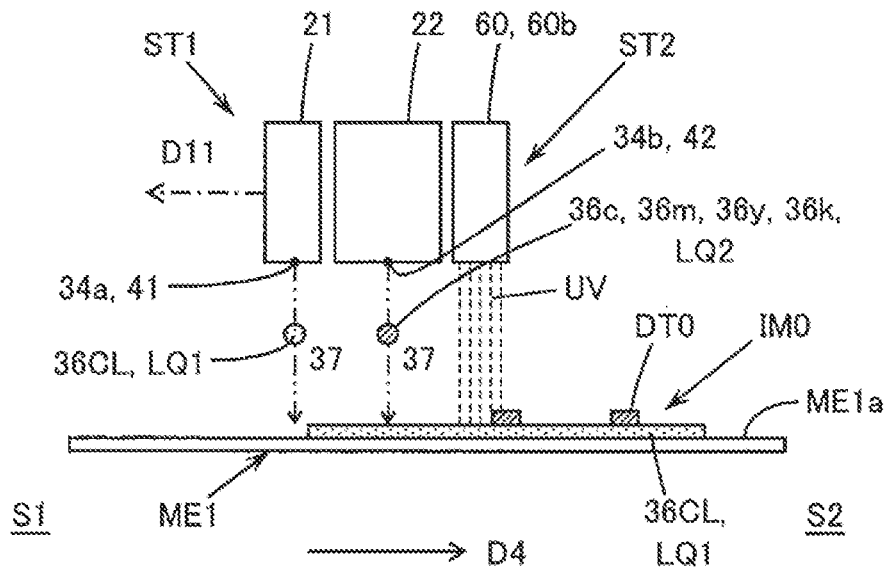
FIG. 8 is a diagram schematically illustrating action of the other printing apparatus of a serial type.

FIG. 8 schematically illustrates the action of the printing apparatus 1B of a serial type illustrated in FIG. 7. Although the main scanning in the forward direction D11 is illustrated in FIG. 8, the relative movement direction D4 is the backward direction D12 during the main scanning in the forward direction D11, and is the forward direction D11 during the main scanning in the backward direction D12 as described above. Here, the relative movement direction D4 is a direction from the upstream side S1 toward the downstream side S2.

During the main scanning, the ink droplets 37 of the clear ink 36CL are ejected from the nozzles 34a of the first nozzle row 41 toward the recording medium ME1 during the movement of the carriage 52, thereby applying the clear ink 36CL to substantially the entire surface of the surface ME1a. Further, during the movement of the carriage 52, the ink droplets 37 of the color inks 36c, 36m, 36y, 36k are ejected from the nozzles 34b of the second nozzle rows 42 toward the recording medium ME1, causing the dots DT0 of the color inks 36c, 36m, 36y, 36k to overlap the clear ink 36CL on the surface ME1a.

Thus, the ejecting step ST1 is implemented.

Furthermore, during the movement of the carriage 52, UV is irradiated from the irradiation unit 60 toward the surface ME1a of the recording medium ME1 onto which the clear ink 36CL and the color inks 36c, 36m, 36y, 36k are deposited. As a result, the clear ink 36CL and the color inks 36c, 36m, 36y, 36k are cured, and the output image IMO is formed on the recording medium ME1.

Thus, the irradiating step ST2 is implemented.

The printing apparatus 1B of a serial type can also, by an action similar to that of the printing apparatus 1A of a line type, reduce the ejection defects caused by the curing of the UV ink in the vicinity of the nozzles by UV leaking from the irradiation unit 60.

Note that, in a case in which the printing apparatus 1B performs unidirectional printing in which the printing apparatus 1B prints only during the main scanning in the forward direction D11, the second head 22 and the first irradiation unit 60a in positions in the forward direction D11 from the first head 21 need not be on the carriage 52.

Figure 9:
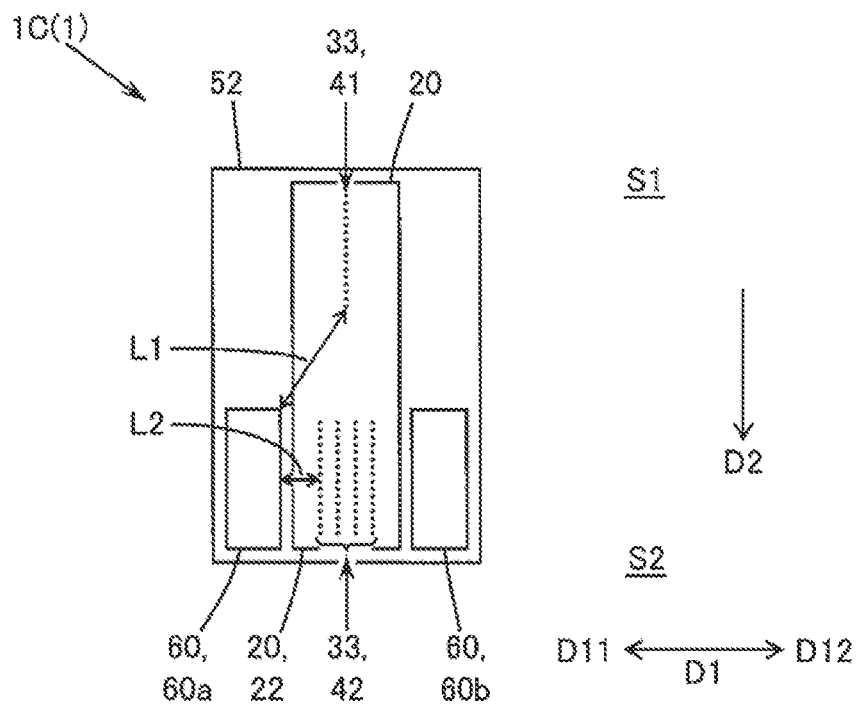
FIG. 9 is a plan view schematically illustrating an example of components mounted on a carriage of another printing apparatus of a serial type.

Further, as illustrated in FIG. 9, one ejection head 20 may include both the first nozzle row 41 and the second nozzle row 42. FIG. 9 is a plan view schematically illustrating components mounted on the carriage 52 in another printing apparatus 1C of a serial type. The printing apparatus 1C is also included in the concept of the printing apparatus 1.

In the ejection head 20 illustrated in FIG. 9, the second nozzle rows 42 are disposed on the downstream side S2 of the first nozzle row 41 in the feeding direction D2. The plurality of irradiation units 60 are disposed on the downstream side S2 of the first nozzle row 41 and include the first irradiation unit 60a in a position in the forward direction D11 from the second nozzle row 42, and the second irradiation unit 60b in a position in the backward direction from the second nozzle rows 42.

The operation of the carriage 52 and the recording medium ME1 is the same as the operation illustrated in FIG. 2. For example, in the third main scanning, the carriage 52 moves in the forward direction D11 and, during the movement, the ejection head 20 ejects the clear ink 36CL from the first nozzle row 41 to the area A3, and ejects the color inks 36c, 36m, 36y, 36k from the second nozzle rows 42 to the area A1. The controller 10 irradiates UV from the second irradiation unit 60b toward the area A1. For example, in the fourth main scanning, the carriage 52 moves in the backward direction D12 and, during the movement, the ejection head 20 ejects the clear ink 36CL from the first nozzle row 41 to an area (not illustrated), and ejects the color inks 36c, 36m, 36y, 36k from the second nozzle rows 42 to the area A2. The controller 10 irradiates UV toward the area A2 from the first irradiation unit 60a.

The printing apparatus 1C of a serial type can also, by an action similar to that of the printing apparatus 1 illustrated in FIG. 2, reduce the ejection defects caused by the curing of the UV ink in the vicinity of the nozzles by UV leaking from the irradiation unit 60.

On the other hand, as illustrated in FIG. 10, the first head 21 and the second head 22 may be mounted on separate carriages. FIG. 10 is a plan view schematically illustrating operation of another printing apparatus 1D of a serial type. The printing apparatus 1D is also included in the concept of the printing apparatus 1.

The driving unit 50 that changes the relative positions of the ejection head 20 and the recording medium ME1 includes the first carriage driving unit 51a including the first carriage 52a, the second carriage driving unit 51b including the second carriage 52b, and the roller driving unit 55. The second carriage 52b is separate from the first carriage 52a, and is disposed on the downstream side S2 of the first carriage 52a. The first carriage 52a and the second carriage 52b are movable in the main scanning direction D1 independently of each other. The first carriage driving unit 51a is an example of the first main scanning unit, and the second carriage driving unit 51b is an example of the second main scanning unit.

The first head 21 including the first nozzle row 41 that ejects the clear ink 36CL is mounted onto the first carriage 52a. The first carriage driving unit 51a moves the first carriage 52a in the main scanning direction D1. The second head 22 including the second nozzle rows 42 that ejects the color inks 36c, 36m, 36y, 36k, the first irradiation unit 60a, and the second irradiation unit 60b are mounted onto the second carriage 52b. The second carriage driving unit 51b moves the second carriage 52b in the main scanning direction D1. Even when the first nozzle row 41 of the first head 21 mounted on the first carriage 52a is closest to the irradiation unit 60, the distance L1 between the irradiation unit 60 and the first nozzle row 41 is longer than the distance L2 between the irradiation unit 60 and the second nozzle rows 42.

As described above, the first carriage driving unit 51a moves the first carriage 52a on the upstream side S1 of the second carriage 52b in the main scanning direction D1, and the first head 21 first ejects the clear ink 36CL to the areas A1, A2, A3 . . . . The second carriage driving unit 51b moves the second carriage 52b on the downstream side S2 of the first carriage 52a in the main scanning direction D1, and the second head 22, after a delay, ejects the color inks 36c, 36m, 36y, 36k to the areas A1, A2, A3 . . . . Here, when the second carriage 52b is moved in the forward direction D11, the controller 10 turns off the first irradiation unit 60a and irradiates UV from the second irradiation unit 60b toward the area where the color inks 36c, 36m, 36y, 36k are ejected. When the second carriage 52b is moved in the backward direction D12, the controller 10 turns off the second irradiation unit 60b and irradiates UV from the first irradiation unit 60a toward the area where the color inks 36c, 36m, 36y, 36k are ejected.

The printing apparatus 1D of a serial type can also, by an action similar to that of the printing apparatus 1 illustrated in FIG. 2, reduce the ejection defects caused by the curing of the UV ink in the vicinity of the nozzles by UV leaking from the irradiation unit 60.

6. Modified Examples

Within the scope of the present disclosure, various modified examples are conceivable.

For example, the colors of the color material of the second liquid that does not contain a photopolymerization initiator are not limited to C, M, Y, and, K, and may include white, orange, green, light cyan having a lower concentration than that of C, light magenta having a lower concentration than that of M, a dark yellow having a higher concentration than that of Y, a light black having a lower concentration than that of K, and the like. Further, this technique can be applied even in a case in which a portion of C, M, Y, and K are not included in the colors of the color material of the second liquid. Furthermore, the color of the second color material of the first liquid containing a photopolymerization initiator is not limited to blue, and various base colors can be applied, such as white, C, M, and Y.

In addition to band printing, the serial-type printing apparatus may perform overlap printing in which printing is partially overlapped across areas, pseudo band printing in which the main scanning of each area is performed two or more times, interlace printing in which rasters are spaced apart and the area between the rasters is filled by the subsequent main scanning, and the like.

Further, in addition to moving the recording medium ME1 in the feeding direction D2 during the sub scanning, the serial-type printing apparatus may move the carriage 52 in the direction opposite to the feeding direction D2.

The printing apparatus may first deposit the second liquid, which does not contain a photopolymerization initiator, onto the recording medium and then deposit the first liquid onto the recording medium. For example, in the carriage 52, the first head 21 may be disposed in a position in the forward direction D11 and in a position in the backward direction D12 from the second head 22 including the second nozzle rows 42 and the irradiation unit 60 may be deposed on the downstream side S2 of the second head 22, satisfying L1>L2. For example, in the main scanning in the forward direction D11, the second liquid LQ2 is ejected from the second nozzle rows 42 of the second head 22 and the first liquid LQ1 is ejected from the first nozzle row 41 of the first head 21 in a position in the backward direction D12 from the second head 22, applying the first liquid LQ1 to the recording medium ME1 and thus causing the first liquid LQ1 to overlap the second liquid LQ2. Even in this case, the photopolymerization initiator of the first liquid LQ1 initiates the polymerization reaction of the polymerizable compound, which cures the first liquid LQ1 and the second liquid LQ2.

Note that, even in a case in which the first liquid LQ1 does not contain a polymerizable compound, the photopolymerization initiator of the first liquid LQ1 initiates the polymerization reaction of the polymerizable compound of the second liquid LQ2, and thus the first liquid LQ1 and the second liquid LQ2 are cured in a state in which the first liquid LQ1 and the second liquid LQ2 are integrated on the surface ME1a of the recording medium ME1.

7. Conclusion

As described above, according to the present disclosure, by various aspects, it is possible to provide a technique or the like that reduces ejection defects caused by the curing of a liquid containing a color material in the vicinity of a nozzle by light leaking from an irradiation unit. Of course, even a technique including only the components recited in the independent claims produces the above-described basic actions and advantages.

Furthermore, the aspects of the present disclosure can implement configurations resulting from mutual replacement of components disclosed in the above-described examples or a change in the combination of the components, configurations resulting from mutual replacement of components disclosed in the known art and the above-described examples or a change in the combination of the components, and the like. The aspects of the present disclosure include these configurations and the like.

What is claimed is:

1. A printing apparatus comprising:
an ejection head including
a first nozzle row configured to eject, toward a recording medium, a first liquid containing a photopolymerization initiator that initiates a polymerization reaction of a polymerizable compound by irradiation with light and
a second nozzle row configured to eject, toward the recording medium, a second liquid containing the polymerizable compound and a color material and not containing the photopolymerization initiator;
a driving unit configured to change relative positions of the ejection head and the recording medium; and
an irradiation unit configured to irradiate, with the light, the recording medium onto which the first liquid and the second liquid are deposited, wherein
the first liquid and the second liquid are ejected from the ejection head so that the second liquid overlaps the first liquid on a surface of the recording medium and
a distance between the irradiation unit and the first nozzle row is longer than a distance between the irradiation unit and the second nozzle row, wherein
the driving unit is configured to change, in a main scanning direction, a relative position of the ejection head with respect to the recording medium and, when the first liquid and the second liquid are not ejected from the ejection head toward the recording medium, change a relative position of the recording medium with respect to the ejection head in a feeding direction that is a direction from upstream toward downstream and intersects the main scanning direction,
the irradiation unit and the second nozzle row are disposed downstream of the first nozzle row in the feeding direction,
the irradiation unit and the second nozzle are arranged in the main scanning direction such that the irradiation unit and the second nozzle overlap each other as viewed in the main scanning direction, and such that the irradiation unit is in a position for irradiation toward the second liquid deposited onto the recording medium, and
in one main scan of the ejection head relatively moving in the main scanning direction, an area of the recording medium configured to be irradiated by the irradiation unit
includes an area on which the second nozzle row is configured to eject the second liquid, and
does not include an area on which the first nozzle row is configured to eject the first liquid.

2. The printing apparatus according to claim 1, wherein the first liquid contains the polymerizable compound and the first nozzle row is configured to eject the first liquid containing the photopolymerization initiator and the polymerizable compound.

3. The printing apparatus according to claim 1, wherein the first liquid contains a second color material and the first nozzle row is configured to eject the first liquid containing the photopolymerization initiator and the second color material.

4. The printing apparatus according to claim 1, wherein the irradiation unit is disposed downstream of the second nozzle row in the main scanning direction.

5. The printing apparatus according to claim 1, wherein the irradiation unit, the second nozzle row, the second nozzle row, and the irradiation unit are disposed in this order in the main scanning direction.

6. The printing apparatus according to claim 1, wherein the ejection head includes
a first head including the first nozzle row and
a second head including the second nozzle row, and
the driving unit includes
a first main scanning unit that includes a first carriage on which the first head is mounted and that is configured to change, in the main scanning direction, a relative position of the first carriage with respect to the recording medium and
a second main scanning unit that includes a second carriage, separate from the first carriage, on which the second head is mounted, and that is configured to change, in the main scanning direction, a relative position of the second carriage with respect to the recording medium.

7. A printing method of a printing apparatus including
an ejection head configured to eject, toward a recording medium, a liquid that is cured by irradiation with light,
a driving unit configured to change relative positions of the ejection head and the recording medium, and
an irradiation unit configured to irradiate, with the light, the recording medium,
the ejection head including a first nozzle row and a second nozzle row,
a distance between the irradiation unit and the first nozzle row being longer than a distance between the irradiation unit and the second nozzle row,
the driving unit being configured to change, in a main scanning direction, a relative position of the ejection head with respect to the recording medium and, when the first liquid and the second liquid are not ejected from the ejection head toward the recording medium, change a relative position of the recording medium with respect to the ejection head in a feeding direction that is a direction from upstream toward downstream and intersects the main scanning direction,
the irradiation unit and the second nozzle row being disposed downstream of the first nozzle row in the feeding direction,
the irradiation unit and the second nozzle being arranged in the main scanning direction such that the irradiation unit and the second nozzle overlap each other as viewed in the main scanning direction, and such that the irradiation unit is in a position for irradiation toward the second liquid deposited onto the recording medium, and
in one main scan of the ejection head relatively moving in the main scanning direction, an area of the recording medium configured to be irradiated by the irradiation unit
including an area on which the second nozzle row is configured to eject the second liquid, and
not including an area on which the first nozzle row is configured to eject the first liquid, and
the printing method comprising:
ejecting, from the first nozzle row toward the recording medium, a first liquid containing a photopolymerization initiator that initiates a polymerization reaction of a polymerizable compound by irradiation with the light, and ejecting, from the second nozzle row toward the recording medium, a second liquid containing the polymerizable compound and a color material and not containing the photopolymerization initiator so that the second liquid overlaps the first liquid on a surface of the recording medium; and
irradiating, with the light, the recording medium onto which the first liquid and the second liquid are deposited.

* * * * *